(12) United States Patent
Hipp et al.

(10) Patent No.: US 7,146,431 B2
(45) Date of Patent: Dec. 5, 2006

(54) VIRTUAL NETWORK ENVIRONMENT

(75) Inventors: Emily L. Hipp, Oakland, CA (US);
Yuh-yen Yeh, San Jose, CA (US);
Burton A. Hipp, Elk Grove, CA (US)

(73) Assignee: Veritas Operating Corporation,
Mountain View, CA (US)

( * ) Notice: Subject to any disclaimer, the term of this patent is extended or adjusted under 35 U.S.C. 154(b) by 40 days.

(21) Appl. No.: 10/811,580

(22) Filed: Mar. 29, 2004

(65) Prior Publication Data
US 2005/0021755 A1 Jan. 27, 2005

Related U.S. Application Data

(63) Continuation of application No. 09/680,567, filed on Oct. 5, 2000, now Pat. No. 6,766,371.

(60) Provisional application No. 60/157,834, filed on Oct. 5, 1999, provisional application No. 60/157,833, filed on Oct. 5, 1999, provisional application No. 60/157,729, filed on Oct. 5, 1999, provisional application No. 60/157,728, filed on Oct. 5, 1999, provisional application No. 60/157,727, filed on Oct. 5, 1999.

(51) Int. Cl.
*G06F 15/173* (2006.01)

(52) U.S. Cl. .................................. 709/238

(58) Field of Classification Search .......... 709/223, 709/225, 245
See application file for complete search history.

(56) References Cited

U.S. PATENT DOCUMENTS

| | | | |
|---|---|---|---|
| 4,160,877 A | 7/1979 | Vander May | |
| 5,537,417 A | 7/1996 | Sharma et al. | |
| 5,621,726 A | 4/1997 | Murakimi | |
| 5,734,865 A | 3/1998 | Yu | |
| 5,764,639 A | 6/1998 | Staples et al. | |
| 5,819,112 A | 10/1998 | Kusters | |
| 5,848,242 A | 12/1998 | Behaghel et al. | |
| 5,867,661 A | 2/1999 | Bittinger et al. | |
| 5,907,696 A * | 5/1999 | Stilwell et al. | 703/13 |
| 5,915,087 A * | 6/1999 | Hammond et al. | 713/201 |
| 5,923,854 A | 7/1999 | Bell et al. | |
| 5,924,094 A * | 7/1999 | Sutter | 707/10 |
| 5,950,195 A * | 9/1999 | Stockwell et al. | 707/4 |
| 5,951,650 A * | 9/1999 | Bell et al. | 709/238 |
| 5,978,568 A * | 11/1999 | Abraham et al. | 709/224 |
| 6,061,349 A | 5/2000 | Coile et al. | |
| 6,085,238 A * | 7/2000 | Yuasa et al. | 709/223 |
| 6,094,712 A | 7/2000 | Follett et al. | |
| 6,201,962 B1 | 3/2001 | Sturniolo et al. | |
| 6,216,159 B1 | 4/2001 | Chintakrindi et al. | |
| 6,247,057 B1 | 6/2001 | Barrera, III | |
| 6,269,404 B1 * | 7/2001 | Hart et al. | 709/238 |

(Continued)

FOREIGN PATENT DOCUMENTS

WO 99/48261 9/1999

*Primary Examiner*—David Y. Eng
(74) *Attorney, Agent, or Firm*—Lawrence J. Merkel; Meyertons, Hood, Kivlin, Kowert & Goetzel, P.C.

(57) ABSTRACT

A virtual network environment to be used by a set of applications for the express purpose of isolating the applications from other applications on the same node or network is disclosed. The virtual network environment encapsulates a set of applications within a virtual network and prevents applications from interfering, either maliciously or unintentionally, with other applications outside of its virtual network environment. This virtual network environment provides security and network isolation between applications, as is required in a hosted application environment.

36 Claims, 7 Drawing Sheets

U.S. PATENT DOCUMENTS

| | | |
|---|---|---|
| 6,327,622 B1 | 12/2001 | Jindal et al. |
| 6,430,622 B1 | 8/2002 | Aiken et al. |
| 6,542,934 B1 | 4/2003 | Bader et al. |
| 6,609,153 B1 * | 8/2003 | Salkewicz ................... 709/223 |
| 6,704,282 B1 | 3/2004 | Sun et al. |
| 6,707,820 B1 | 3/2004 | Arndt et al. |
| 6,714,549 B1 | 3/2004 | Phaltankar |
| 6,735,626 B1 * | 5/2004 | Tezuka et al. .............. 709/223 |
| 6,766,371 B1 | 7/2004 | Hipp et al. |
| 6,789,090 B1 * | 9/2004 | Miyake et al. ........... 707/104.1 |
| 6,898,636 B1 * | 5/2005 | Adams et al. .............. 709/229 |
| 6,963,932 B1 * | 11/2005 | Bhat .......................... 709/249 |

* cited by examiner

VIRTUAL NETWORK ENVIRONMENT

REFERENCE TO RELATED APPLICATIONS

This application is a continuation of U.S. patent application Ser. No. 09/680,567, entitled "VIRTUAL NETWORK ENVIRONMENT", filed Oct. 5, 2000, now U.S. Pat. No. 6,766,371, which claims the benefit of U.S. provisional application Ser. No. 60/157,727 filed Oct. 5, 1999, the benefit of U.S. provisional application Ser. No. 60/157,728 filed Oct. 5, 1999, the benefit of U.S. provisional application Ser. No. 60/157,729 filed Oct. 5, 1999, the benefit of U.S. provisional application Ser. No. 60/157,833 filed Oct. 5, 1999, and the benefit of U.S. provisional application Ser. No. 60/157,834 filed Oct. 5, 1999. These applications are incorporated herein by reference in their entireties.

FIELD

The present invention relates broadly to computer networks. Specifically, the present invention relates to a virtual network environment to be used by a set of applications for the express purpose of isolating the applications from other applications on the same node or network.

BACKGROUND OF THE INVENTION

Global computer networks such as the Internet have allowed electronic commerce ("e-commerce") to flourish to a point where a large number of customers purchase goods and services over websites operated by online merchants. Because the Internet provides an effective medium to reach this large customer base, online merchants who are new to the e-commerce marketplace are often flooded with high customer traffic from the moment their websites are rolled out. In order to effectively serve customers, online merchants are charged with the same responsibility as conventional merchants: they must provide quality service to customers in a timely manner. Often, insufficient computing resources are the cause of a processing bottleneck that results in customer frustration and loss of sales. This phenomena has resulted in the need for a new utility: leasable online computing infrastructure. Previous attempts at providing computing resources have entailed leasing large blocks of storage and processing power. However, for a new online merchant having no baseline from which to judge customer traffic upon rollout, this approach is inefficient. Either too much computing resources are leased, depriving a start up merchant of financial resources that are needed elsewhere in the operation, or not enough resources are leased, and a bottleneck occurs.

Security is one of the major impediments to an on-demand leasable computer infrastructure. In a hosted environment, one or more applications may be running on a shared computer or network at any given time. These applications may belong to the same customer/user or they may belong to different (even competing) customers/users. If on-demand leasable computer infrastructure is to be made possible, security measures are necessary to ensure that applications do not interfere with each other, either intentionally or unintentionally. Previous approaches have focused on physical isolation using a firewall. A firewall is useful in separating a computer or group of computers in a network setting from computers beyond the firewall, but cannot separate or insulate computers behind the firewall from each other. Thus, there remains a heartfelt need to isolate groups of application such that they may be located as needed on a computer network without risk of interference with other applications.

SUMMARY OF THE INVENTION

The present invention provides a system, method, and computer program product for grouping a set of applications into a virtual network environment and isolating the application from other applications in other virtual network environments. The present invention provides isolation at the application level, rather than at the host level. As a result, applications residing on the same computer or network can be kept isolated from one another, allowing for secure shared resources.

The Virtual Network Environment (VNE) of the present invention is defined by a collection of IP addresses. An application running within one VNE can communicate with another application in the same VNE. However, an application in one VNE cannot communicate with an application in another VNE (unless expressly permitted). These and many other attendant advantages of the present invention will be understood upon reading the following detailed description in conjunction with the drawings.

DETAILED DESCRIPTION

Figure 1:
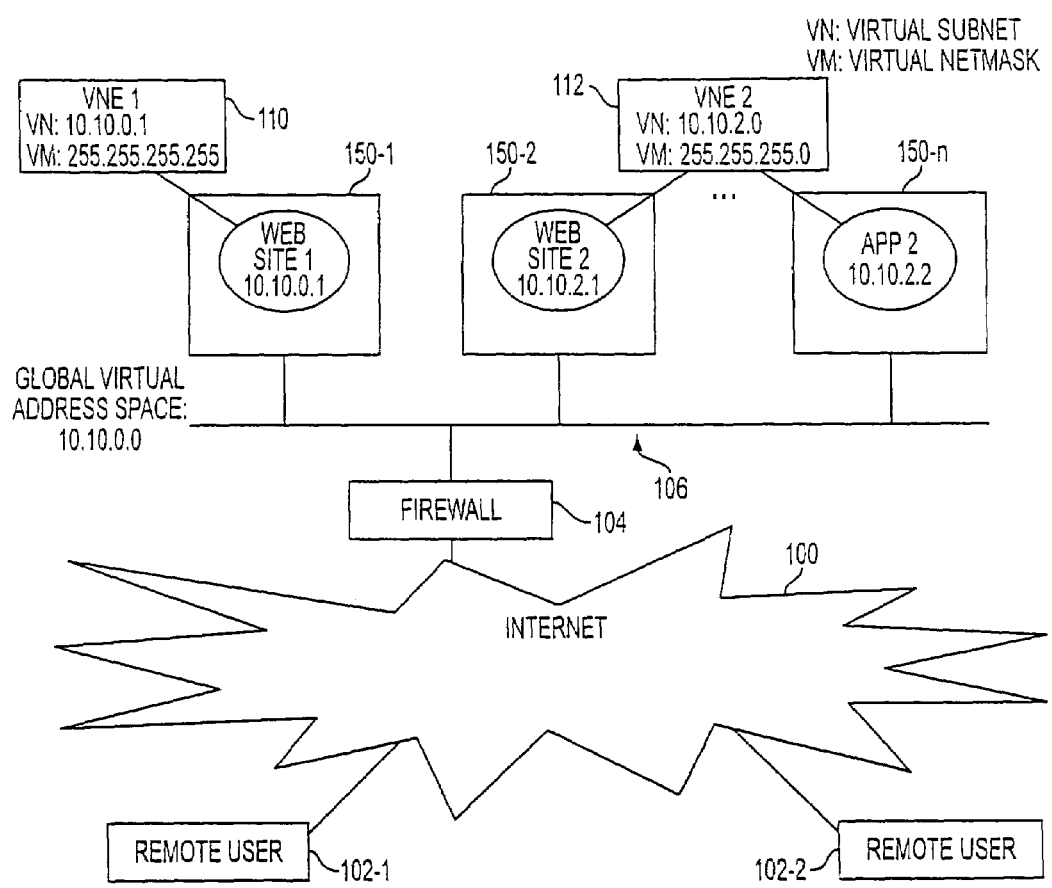
FIG. 1 is a high level block diagram illustrating the various components of a computer network typically utilized by the present invention.

FIG. 1 illustrates in high level block diagram form the overall structure of the present invention as used in connection with a global computer network 100 such as the Internet. Remote users 102-1 and 102-2 can connect through the computer network 100 to a private network of computers 106 protected by firewall 104. Computer network 106 is a network comprising computers 150-1, 150-2, through 150-n, where n is the total number of computers in network 106. Computers 150 are used to run various applications, as well as host web sites for access by remote users 102. The present invention is implemented on computer network 106 in the form of virtual network environment (VNE) 110 and VNE 112.

An application IP address is an IP address associated with an application. It can be a virtual IP address, associated solely with an application, or it can be a real IP address, associated with an interface on the host where the application resides. The application IP address is the IP address the application uses as the local address for all communications. The present invention may be utilized in both virtual and interface IP addresses.

The Virtual Network Environment (VNE) is defined by a collection of IP addresses related to applications that are contained within the VNE or have the potential of being placed in the VNE. An application as used herein refers to one or more executable programs working together to perform one or more functions. One or more applications can be grouped into a VNE. An application running within one VNE can communicate with another application in the same VNE. However, an application in one VNE can not communicate with an application in another VNE unless expressly permitted. The IP address used by the application is contained within the application's VNE. An IP address can only exist in one VNE at a time. Assigned IP addresses within a VNE are invariant for the life of the application or the life of a VNE. If the application IP address corresponds to an interface on the host, then all applications running on the host using the interface address must be included (running within the VNE framework 200) in the VNE.

The VNE is specified at application run time. The VNE is transparent to the application and does not require any modifications to the application. The VNE is defined by subnet of addresses contained within the VNE. For example, all applications within the subnet 10.10.2.0 comprise a VNE. The subnet/netmask specifying such a VNE would be 10.10.2.0/255.255.255.0 and would include the addresses 10.10.2.0 through 10.10.2.255. In this example, an application with IP address 10.10.2.2 would be able to communicate with an application at address 10.10.2.60, but not at 10.10.0.1. Although using a subnet/netmask to specify the VNE is described herein for illustrative purposes, it is to be understood that other methods may be used to accomplish the same mechanism (e.g. an access control list).

Figure 2:
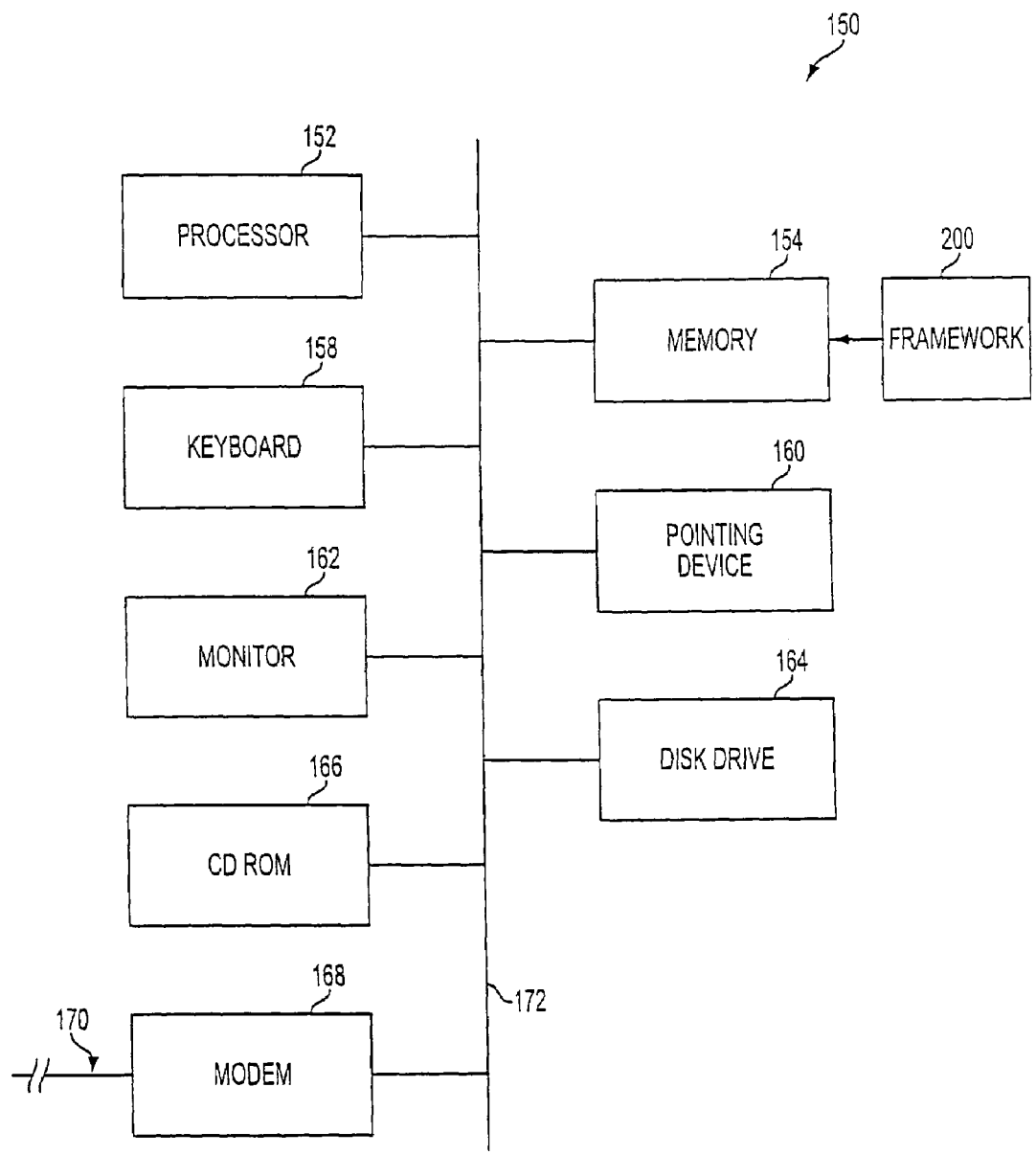
FIG. 2 is a high level block diagram illustrating the various components of a computer as used in connection with the present invention.

FIG. 2 illustrates in high level block diagram form a computer that may be utilized in connection with the present invention. Computer 150 incorporates a processor 152 utilizing a central processing unit (CPU) and supporting integrated circuitry. Memory 154 may include RAM and NVRAM such as flash memory, to facilitate storage of software modules executed by processor 152, such as VNE framework 200. Also included in computer 150 are keyboard 158, pointing device 160, and monitor 162, which allow a user to interact with computer 150 during execution of software programs. Mass storage devices such as disk drive 164 and CD ROM 166 may also be in computer 150 to provide storage for computer programs and associated files. Computer 150 may communicate with other computers via modem 168 and telephone line 170 to allow the computer 150 to be operated remotely, or utilize files stored at different locations. Other media may also be used in place of modem 168 and telephone line 170, such as a direct connection or high speed data line. The components described above may be operatively connected by a communications bus 172.

Figure 3:
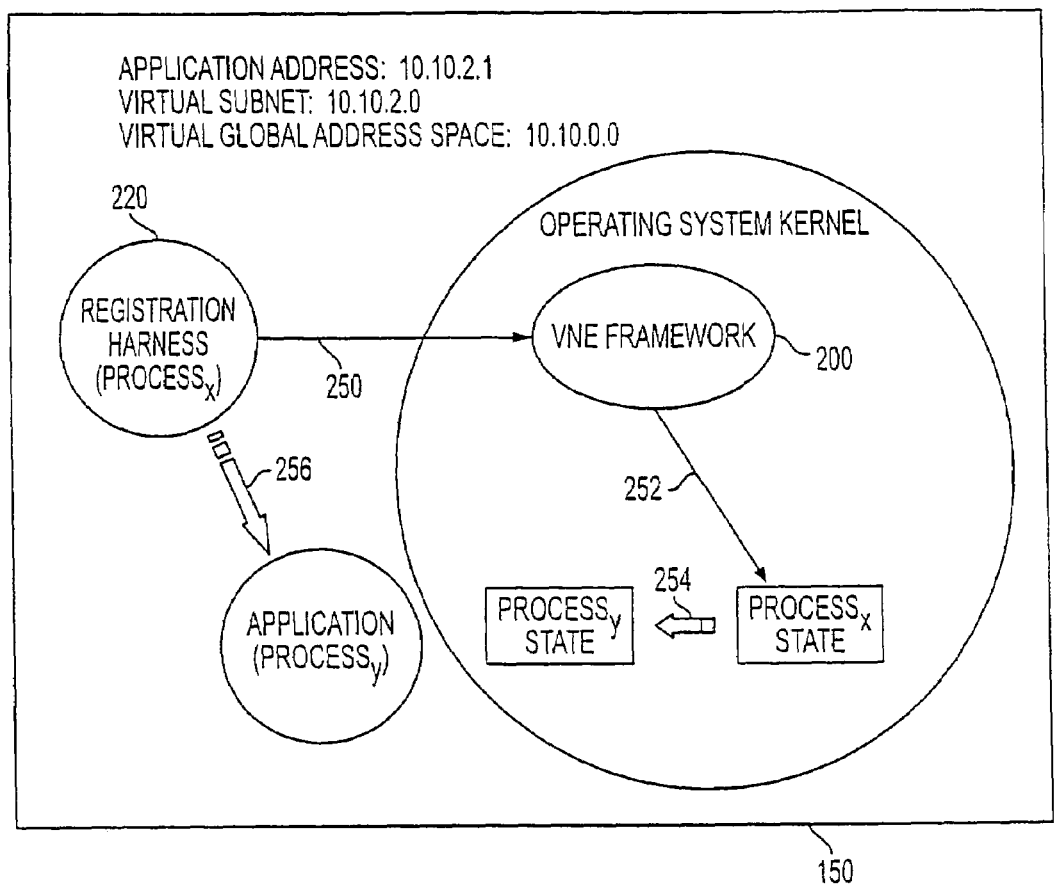
FIG. 3 is a data flow diagram illustrating the registration of a virtual network environment parameters as used in connection with the present invention.

FIG. 3 is a data flow diagram illustrating the registration of virtual network environment parameters. The VNE framework 200 is a software module that processes transactions between the applications and the operating system. The VNE parameters are registered with the VNE framework 200 at the time the application is started. The VNE parameters include the application IP address, the virtual network subnet, and the global virtual address subnet. At step 250, the registration harness 220 supplies the application IP address, virtual subnet, and the global virtual address subnet for a $process_x$ to the VNE framework 200. The VNE framework 200 then records the IP address, virtual subnet, and the global virtual address subnet for the $process_x$ at step 252. The $process_x$ can then spawn additional processes (or create additional objects) at step 254, the new $process_y$ inherits the IP address, virtual subnet, and global virtual address subnet from $process_x$. At step 256, the registration harness 220 launches the application related to $process_y$.

The VNE framework 200 isolates an application within a VNE. Whenever an application running within the VNE communicates over a network connection, checks are made by the VNE framework 200 to ensure the remote address is either within the application's VNE or is to an allowable destination. Any communication to an application in another VNE is not permitted (i.e. the packet is not sent and an error is returned).

The purpose of the VNE is to isolate applications running in the shared resource environment. Therefore, although checks are made to ensure there is no communication between VNEs, communication with remote applications is still allowed. For illustrative purposes, consider a first VNE containing a web server for company X and a second VNE containing a web server for company Z. The VNE framework 200 keeps the two VNEs separate, but both VNEs can communicate with a remote client.

Virtual Network Environments are contained in a Global Virtual Address Space. The Global Virtual Address Space is used by the VNE framework 200 to define the list of all VNEs. The Global Virtual Address Space allows the VNE framework 200 to distinguish between communication with a remote application and communication with another VNE. In a similar fashion as the VNE, in the preferred embodiment the Global Virtual Address Space is specified using a network/subnet and a netmask. However, it can be specified using other methods, such as by using an access list.

Figure 4:
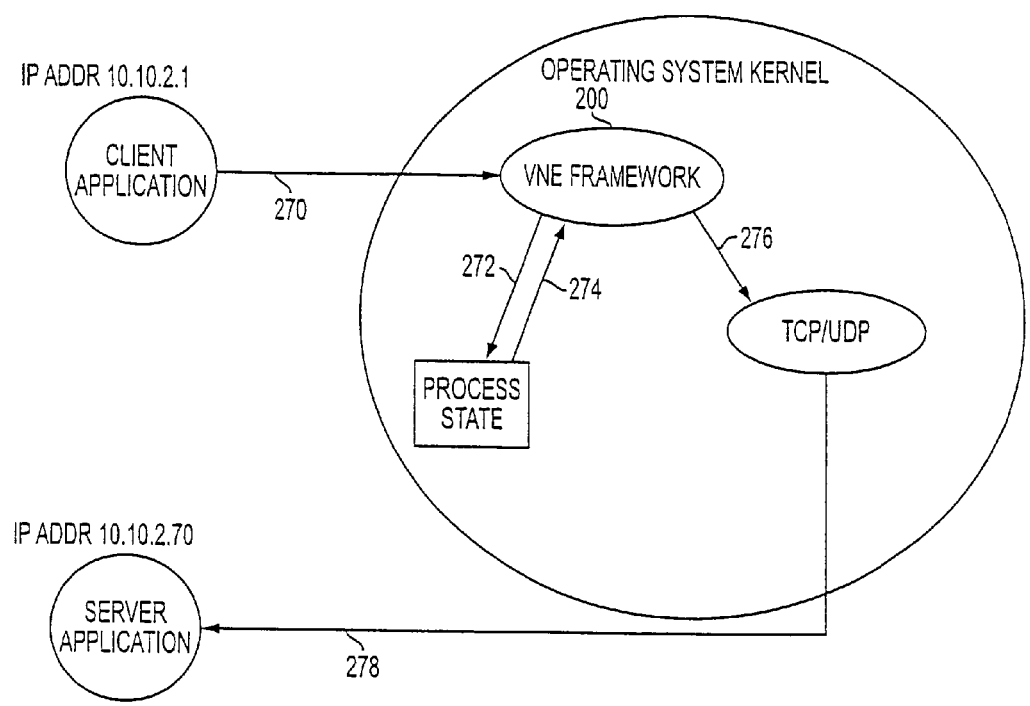
FIG. 4 is a data flow diagram illustrating the steps executed to connect a client application with a server application, both having a virtual network identity, from the perspective of the client application.

FIG. 4 is a data flow diagram illustrating the steps executed to connect a client application with a server application, both having a virtual network identity from the perspective of the client application. The VNE framework 200 ensures that the specified application IP address is chosen as the local address whenever the application performs any network communications. This ensures the application is running within the correct VNE. When the application instance accepts a connection or receives data from a remote application, the local IP address chosen must be the specified IP address. When connecting or sending data to a remote application, the local address again must be the application IP address.

Beginning at step 270, a client application requests to the VNE framework 200 to connect or send to an address of another application, such as a server application having the address 10.10.2.70: port 9001. At step 272, the VNE framework 200 requests the VNE parameters for the process corresponding to the client application from a process state storage structure. The structure that stores process state is a structure that the operating system uses to store private information about the process. Therefore, it may differ depending on the operating system. The parameters added the process state storage structure as part of the virtual network environment are listed below:

```
typedef struct {
    ipaddr_t app_address;
    ipaddr_t virtual_subnet;
    ipaddr_t virtual_mask;
    ipaddr_t global_subnet;
    ipaddr_t global_mask;
} vne_param_t;
```

At step 274, the VNE parameters for the client application are returned, in this case local address 10.10.2.1 virtual subnet/mask 10.10.2.0/255.255.255.0 and global virtual subnet/mask 10.10.0.0/255.255.0.0. At step 276 the VNE makes a call to the TCP/UDP module to ensure the TCP/UDP module picks the application IP address (in this case 10.10.2.1) as the local address. The TCP/UDP module is the transport layer module provided in the host's operating system. Next, the VNE compares the destination address, in this case 10.10.2.70, to the virtual subnet and mask (10.10.2.0/255.255.255.0) of the client application, to determine if the destination server application address is in the same VNE as the sending application. Since the destination is in the same VNE, the VNE framework 200 allows the client to connect to the server by passing the client connect system call on to the TCP/UDP module. At step 278, The TCP/UDP module then initiates a TCP connection to the server application at 10.10.2.70 port 9001 on behalf of the client.

Figure 5:
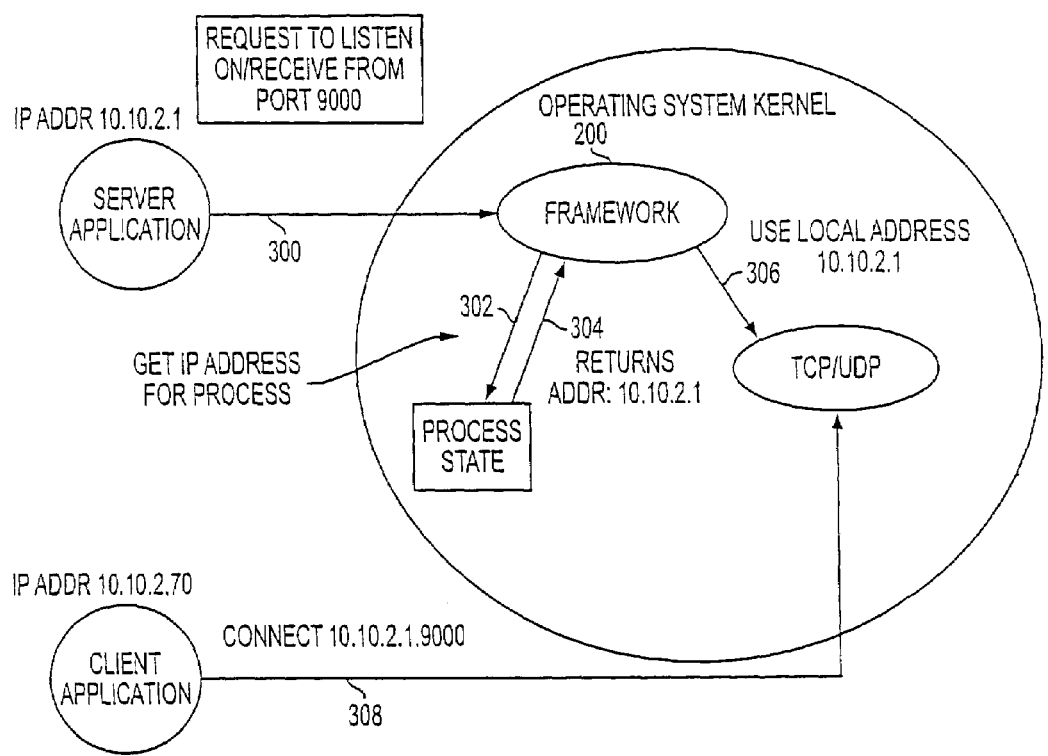
FIG. 5 is a data flow diagram illustrating the steps executed to connect a client application with a server application, both having a virtual network identity, from the perspective of the server application.

FIG. 5 is a data flow diagram illustrating the steps executed to connect a client application with a server application, both having a virtual network identity, from the perspective of the server application.

At step 300, a server application makes to the VNE framework 200 a request to listen or receive on a port. At step 302, the VNE framework 200 gets the IP address for the process corresponding to the server application. At step 304, the local IP address (10.10.2.1) for the server application is returned. At step 306, the VNE framework 200 makes a call to the TCP/UDP module to ensure that the application IP address (in this case 10.10.2.1) is used as the local address for any incoming connections/data. At step 308, the client application connects to the server application at address 10.10.2.1:9000 using the standard TCP protocol.

Figure 6:
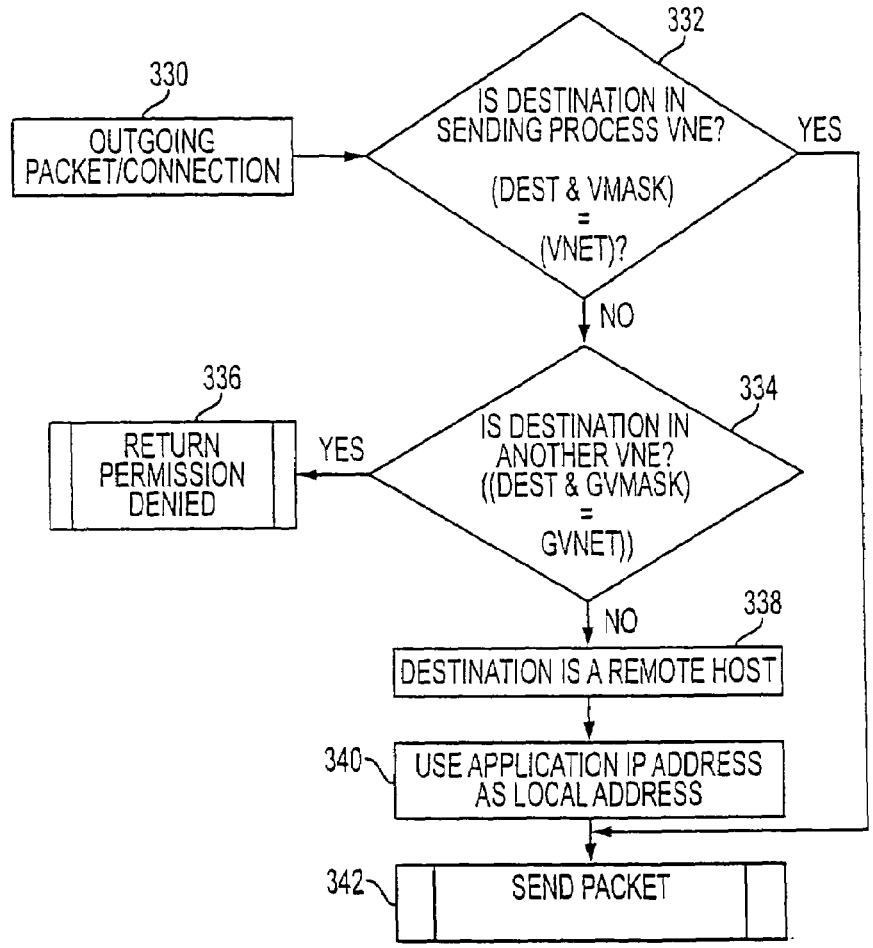
FIG. 6 is a flow chart illustrating the logical sequence of steps to control outgoing packets.

FIG. 6 is a flow chart illustrating the logical sequence of steps to control outgoing packets. For the applications running within a VNE, the following checks are made during a send or connection attempt system call. When outgoing packets are sent by an application (step 330), if the destination address is within the application's VNE (step 332), the packet is sent (step 342). If the destination is not within the application's VNE, checks are made to determine if the destination address is in the Global Virtual Address space (step 334). If the destination is to another VNE (i.e. some other VNE), a permission denied error is returned (step 336). If the destination is outside of the Global Virtual Address space (step 338), the application IP address is used as the local address (step 340) and the packet is sent (step 342).

Figure 7:
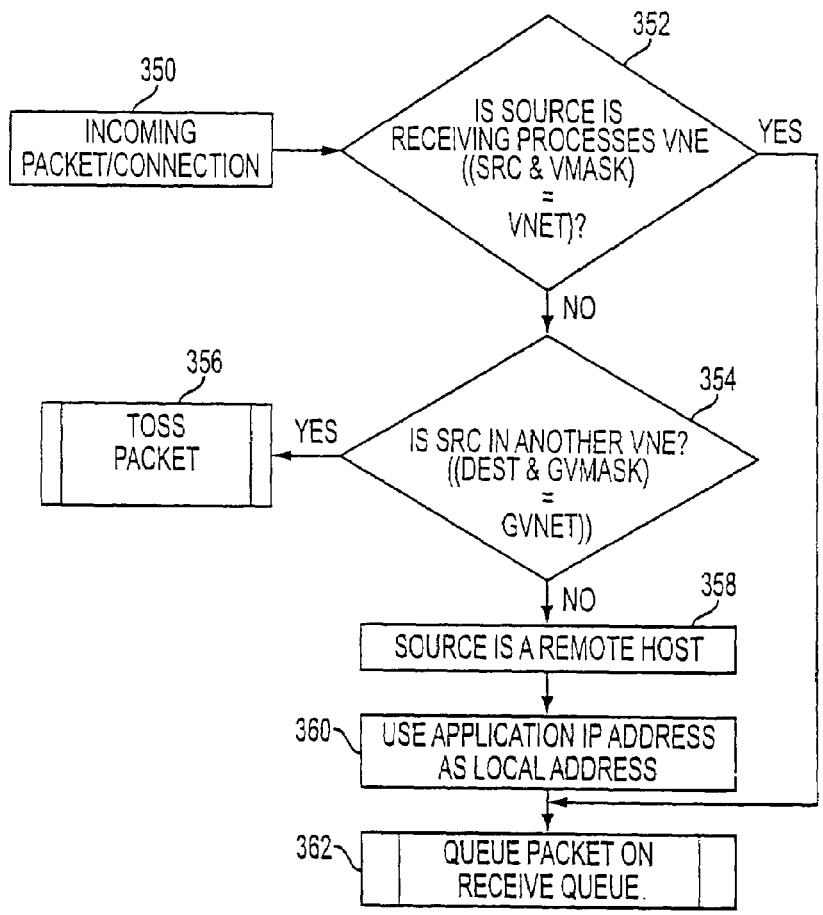
FIG. 7 is a flow chart illustrating the logical sequence of steps to control incoming packets.

FIG. 7 is a flow chart illustrating the logical sequence of steps to control incoming packets. For the applications running within the VNE, inbound packets (350) are checked to determine if the source address is in the listening/receiving application's VNE (step 352). If so, the packet is queued on the receive queue (step 362). If the packet's source address is not from the listening/receiving application's VNE, control proceeds to step 354 where a check is made by the VNE framework 200 to determine if the source address is in the Global Virtual Address space but not the application's VNE. If this is true, the packet is discarded (step 356). If not, the source is determined to be a remote host (step 358) and the application IP address is used as the local address (step 360) and the packet is queued on the receive queue (step 362).

Virtualization of network identity is achieved by assigning a unique virtual IP address and virtual hostname to a group of processes that make up the application instance which the instance keeps throughout its execution. This virtual network identity stays with the application instance regardless of which node the application is running on. The framework, in essence, provides a mechanism to create this virtual network identity (VNI) around the application using the virtual network parameters assigned to it. In one embodiment, the virtual network parameters include an IP address and hostname. The framework 200 ensures that the application's instance uses the virtual network parameters, transparently, so that it can be moved across machines, without modifications to the application.

The virtual hostname resolves to the virtual IP address for both the applications registered with the VNI framework as well as those that are not registered. This may require configuration of a name service or OS host configuration files. For example, if an application instance used a virtual IP address of 10.10.0.1 and a virtual hostname of host 1055, the standard hostname to IP address resolution mechanisms (e.g. DNS or the /etc/hosts file) would have to be preconfigured to resolve a query of host 1055 to IP address 10.10.0.1.

Any application configuration of addresses and hostmames uses the virtual hostmame and virtual IP address assigned to the instance. Virtualization of network identities is transparent to the application running within a VNI. From the perspective of the application, the application is running on a single node which has an assigned IP address that corresponds to one of its network interfaces. The application requires no modifications to run in within the VNI framework.

A virtual address and virtual hostname are assigned to the application instance before the application is run. This virtual address may be statically preassigned or it can be dynamically assigned by an address resource manager. Registration of the virtual address and virtual hostname is made to the framework 200, which in turn installs a virtual interface for the virtual IP address and records the IP address and hostname for the processes associated with the application. The virtual IP address is unique to the application while the application is running. Similarly, the virtual hostname can be preassigned or dynamically assigned by an external entity or created using an algorithm based on the IP address to ensure uniqueness. When the application is to be run, the virtual IP address is allocated/installed as a virtual interface on the node. The virtual interface remains on the node as long as the application is running on that node. In one embodiment, a virtual network interface is a logical interface that allows a node to associate one or more IP addresses with existing physical or loopback network interfaces on the computer. This functionality is provided by some standard operating systems and allows the host to use one or more IP addresses as the local address for a single network interface.

Having disclosed exemplary embodiments and the best mode, modifications and variations may be made to the disclosed embodiments while remaining within the scope of the present invention as defined by the following claims.

What is claim is:

1. A method comprising:
   defining a global address space identifying a plurality of internet protocol (IP) addresses that are reserved for use in one or more virtual network environments, wherein each virtual network environment includes one or more of the plurality of IP addresses;
   assigning a first IP address of the plurality of IP addresses to a first application;
   assigning a second IP address of the plurality of IP addresses to a second application; and
   if the first application is to be isolated from the second application, including the first IP address in a first virtual network environment and including the second IP address in a second virtual network environment different from the first virtual network environment, wherein the first virtual network environment is transparent to the first application, and wherein the second virtual network environment is transparent to the second application.

2. The method as recited in claim 1 further comprising, if the first application is to be permitted to communicate with the second application, including the first IP address and the second IP address in a same virtual network environment.

3. The method as recited in claim 1 wherein the first IP address is a virtual IP address.

4. The method as recited in claim 1 wherein the first IP address is a physical IP address of a computer on which the first application is executing.

5. The method as recited in claim 1 wherein defining the global address space comprises specifying a global subnet and a global netmask that encompass the plurality of IP addresses.

6. The method as recited in claim 5 wherein the plurality of IP addresses are virtual.

7. The method as recited in claim 5 further comprising associating the global subnet and global netmask with the first application and the second application.

8. The method as recited in claim 7 further comprising associating a first subnet and a first netmask with the first application, the first subnet and the first netmask defining the first virtual network environment.

9. The method as recited in claim 8 wherein the global subnet, the global netmask, the first subnet, and the first netmask are parameters of a process state of the first application.

10. The method as recited in claim 1 further comprising:
    the first application initiating a communication to a third IP address; and
    if the third IP address is not in the global address space, permitting the communication.

11. The method as recited in claim 10 further comprising, if the third IP address is in the global address space and also within a same virtual network environment as the first IP address, permitting the communication.

12. The method as recited in claim 10 further comprising, if the third IP address is in the global address space and not within a same virtual network environment as the first IP address, preventing the communication.

13. A computer readable medium tangibly storing a plurality of instructions which, when executed:
    define a global address space identifying a plurality of internet protocol (IP) addresses that are reserved for use in one or more virtual network environments, wherein each virtual network environment includes one or more of the plurality of IP addresses;
    assign a first IP address of the plurality of IP addresses to a first application;
    assign a second IP address of the plurality of IP addresses to a second application; and
    if the first application is to be isolated from the second application, include the first IP address in a first virtual network environment and include the second IP address in a second virtual network environment different from the first virtual network environment, wherein the first virtual network environment is transparent to the first application, and wherein the second virtual network environment is transparent to the second application.

14. The computer readable medium as recited in claim 13 wherein, if the first application is to be permitted to communicate with the second application, the plurality of instructions, when executed, include the first IP address and the second IP address in a same virtual network environment.

15. The computer readable medium as recited in claim 13 wherein the first IP address is a virtual IP address.

16. The computer readable medium as recited in claim 13 wherein the first IP address is a physical IP address of a computer on which the first application is executing.

17. The computer readable medium as recited in claim 13 wherein defining the global address space comprises specifying a global subnet and a global netmask that encompass the plurality of IP addresses.

18. The computer readable medium as recited in claim 17 wherein the plurality of IP addresses are virtual.

19. The computer readable medium as recited in claim 17 wherein the plurality of instructions, when executed, associate the global subnet and global netmask with the first application and the second application.

20. The computer readable medium as recited in claim 19 wherein the plurality of instructions, when executed, associate a first subnet and a first netmask with the first application, the first subnet and the first netmask defining the first virtual network environment.

21. The computer readable medium as recited in claim 20 wherein the global subnet, the global netmask, the first subnet, and the first netmask are parameters of a process state of the first application.

22. The computer readable medium as recited in claim 13 wherein the plurality of instructions, when executed:
    in response to the first application initiating a communication to a third IP address, and
    if the third IP address is not in the global address space, permit the communication.

23. The computer readable medium as recited in claim 22 wherein, if the third IP address is in the global address space and also within a same virtual network environment as the first IP address, the plurality of instructions, when executed, permit the communication.

24. The computer readable medium as recited in claim 22 wherein, if the third IP address is in the global address space and not within a same virtual network environment as the first IP address, the plurality of instructions, when executed, prevent the communication.

25. A system comprising a plurality of computers coupled in a network, wherein at least one of the computers comprises a computer readable medium tangibly storing a plurality of instructions which, when executed:
    define a global address space identifying a plurality of internet protocol (IP) addresses that are reserved for use in one or more virtual network environments, wherein each virtual network environment includes one or more of the plurality of IP addresses;

assign a first IP address of the plurality of IP addresses to a first application;

assign a second IP address of the plurality of IP addresses to a second application; and if the first application is to be isolated from the second application, include the first IP address in a first virtual network environment and include the second IP address in a second virtual network environment different from the first virtual network environment, wherein the first virtual network environment is transparent to the first application, and wherein the second virtual network environment is transparent to the second application.

26. The system as recited in claim 25 wherein if the first application is to be permitted to communicate with the second application, the plurality of instructions, when executed include the first IP address and the second IP address in a same virtual network environment.

27. The system as recited in claim 25 wherein the first IP address is a virtual IP address.

28. The system as recited in claim 25 wherein the first IP address is a physical IP address of one of the plurality of computers on which the first application is executing.

29. The system as recited in claim 25 wherein defining the global address space comprises specifying a global subnet and a global netmask that encompass the plurality of IP addresses.

30. The system as recited in claim 29 wherein the plurality of IP addresses are virtual.

31. The system as recited in claim 29 wherein the plurality of instructions, when executed, associate the global subnet and global netmask with the first application and the second application.

32. The system as recited in claim 31 wherein the plurality of instructions, when executed, associate a first subnet and a first netmask with the first application, the first subnet and the first netmask defining the first virtual network environment.

33. The system as recited in claim 32 wherein the global subnet, the global netmask, the first subnet, and the first netmask are parameters of a process state of the first application.

34. The system as recited in claim 25 wherein, in response to the first application initiating a communication to a third IP address,and;

if the third IP address is not in the global address space, the plurality of instructions, when executed. permit the communication.

35. The system as recited in claim 34 wherein, if the third IP address is in the global address space and also within a same virtual network environment as the first IP address, the plurality of instructions, when executed, permit the communication.

36. The system as recited in claim 34 wherein,if the third IP address is in the global address space and not within a same virtual network environment as the first IP address, the plurality of instructions, when executed, prevent the communication.

* * * * *